F. FAIRBANKS & T. SPOONER.
Scale for Weighing Pasteboard.
No. 198,877. Patented Jan. 1, 1878.
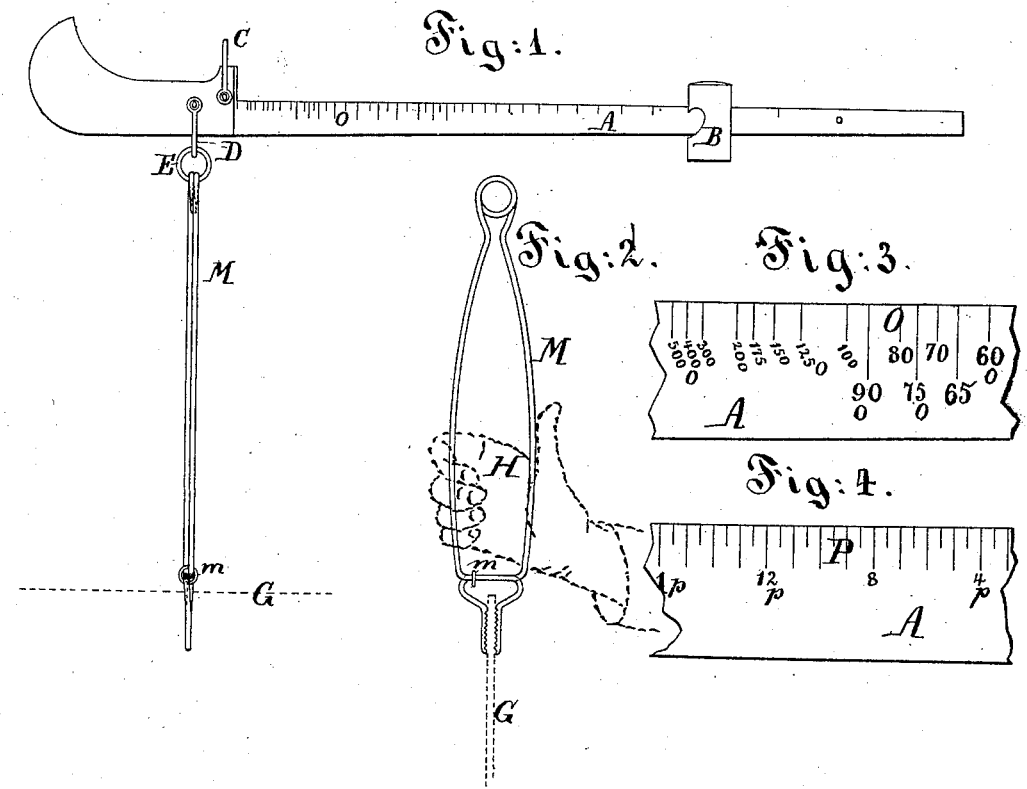

UNITED STATES PATENT OFFICE.

FRANKLIN FAIRBANKS AND THOMAS SPOONER, OF ST. JOHNSBURY, VERMONT, ASSIGNORS TO E. AND T. FAIRBANKS & CO., OF SAME PLACE.

IMPROVEMENT IN SCALES FOR WEIGHING PASTEBOARD.

Specification forming part of Letters Patent No. 198,877, dated January 1, 1878; application filed November 26, 1877.

*To all whom it may concern:*

Be it known that we, FRANKLIN FAIRBANKS and THOMAS SPOONER, both of St. Johnsbury, Caledonia county, in the State of Vermont, have invented new and useful Improvements in Scales for Weighing Pasteboard, of which the following is a specification:

It is necessary, in the manufacture of pasteboard, to determine at short intervals the weights of the sheets being produced, in order that the operation may be so conducted as to keep the weights of all the sheets in a lot approximately uniform. The device ordinarily used for this purpose has been a spring-balance. The great elasticity of the spring required in a balance for this purpose, and the liability of such weighing apparatus to get out of order, make it very unreliable. The faults in the ordinary weighing apparatus for this use have induced much mischief.

We suspended a single sheet of pasteboard to a weighing-beam peculiarly graduated, and thereby determined, by simple inspection and without calculation, either the number or the weight, or both.

By our new beam and connected clamp these difficulties are obviated. Our beam is so divided and marked that it will give, by weighing one sheet or one piece, the number of sheets or number of pieces that it will take to weigh fifty pounds. What is known technically as the number of the sheet is the number of sheets there are in fifty pounds. It is ordered and sold by its number—*i. e.*, so many tons of such or such a "number" of a given size.

Our weighing apparatus will also give the actual weight, in pounds, ounces, and parts of an ounce, of the sheet or piece, and all with one poise and without changing.

The following is a description of what we consider the best means of carrying out the invention.

In the accompanying drawings, forming a part of this specification, Figure 1 is a side view of the device complete, with a portion of a sheet of pasteboard indicated in dotted lines; and Fig. 2 is a view of the clamping device at right angles thereto. The remaining figures represent portions on a larger scale. Fig. 3 shows a part of the right-hand side—the same side which is shown in Fig. 1 of the beam. Fig. 4 shows a part of the reverse side.

Similar letters of reference indicate like parts in all the figures.

A is a weighing-beam, provided with a sliding poise, B, and with the ordinary suspending-loop C, and the ordinary loop D for the load which is to be weighed, both loops applying on delicately-finished knife-edges, as usual. E is a ring, engaging in the loop D, and serving as a connection to a peculiarly-formed spring-clamp, M. In this clamp arms extend downward, and terminate at the bottom with parallel ends. A ring, *m*, loosely encircles horizontal parallel parts above, and, by keeping the two arms in close contact with each other, insures that the ends shall meet truly as they are brought together by the elasticity of the parts.

To open the clamp, it is necessary simply to seize it by the hand in the position shown by H in dotted lines, Fig. 2.

G is a sheet of pasteboard held by this clamp, the hold of which is due to the elasticity of the clamping device, and the automatic spring-action, being relied on, insures that the clamp shall never be set so tight as to impress and injure the pasteboard.

The beam A is divided on the right-hand side by marks O, which are unequally spaced, the divisions farthest from the point of suspension being much the largest. They are numbered in the reverse order to that of the ordinary graduations, the exterior being the smallest, and increasing inward. The corresponding figuring *o* is represented as stepped at some points, to give more room for the figuring; but we can omit this, or we can step the figures still more, having three or more lines of figures instead of two, as shown.

These marks and numbers are so arranged and proportioned that, on the poise B being moved on the beam until it balances the weight of a sheet held in the clamp M, it indicates correctly and without calculation the number of such sheets required to make fifty pounds.

On the other side, which is usually called the "left-hand side" of the beam, is a series of ordinary equal graduations, P, with ordinary figuring p. These graduations show the actual weight of the single sheet of pasteboard held in the clamp, indicating it, in the ordinary manner, in pounds and ounces.

The graduations and figures on the left-hand side will serve not only for weighing purposes, but for a test for the other side of the beam, and will always show the correctness of the indication. Hang in a sheet or piece of board, and if it shows 10 on the right-hand side, it will take ten sheets for fifty pounds, and will weigh, as shown by the left-hand side, five pounds; or, if 20, 25, 50, 100, or 400, it will show relative weights of each sheet as well as the number.

For paper-box manufacturers and others requiring to know the weight of the board or pieces of board used, this device is of very great importance, as this beam will readily tell the number of sheets in fifty pounds, and also the weight of a sheet in pounds, ounces, and parts of ounces, and all with one poise.

We claim as our invention—

The beam A, divided on one side by marks O, unequally spaced and numbered in reverse order to that of ordinary graduations, in combination with the poise B and spring-clamp M, substantially as described, and for the purpose set forth.

In testimony whereof we have hereunto set our names in presence of two subscribing witnesses.

FRANKLIN FAIRBANKS.
    THOMAS SPOONER.

Witnesses:
 E. D. BLODGETT,
 D. DEAN PATTERSON.